March 4, 1941. M. F. CAMPBELL 2,233,993
LOADING AND UNLOADING OF WORK IN MACHINE TOOLS
Filed July 13, 1938 3 Sheets-Sheet 2
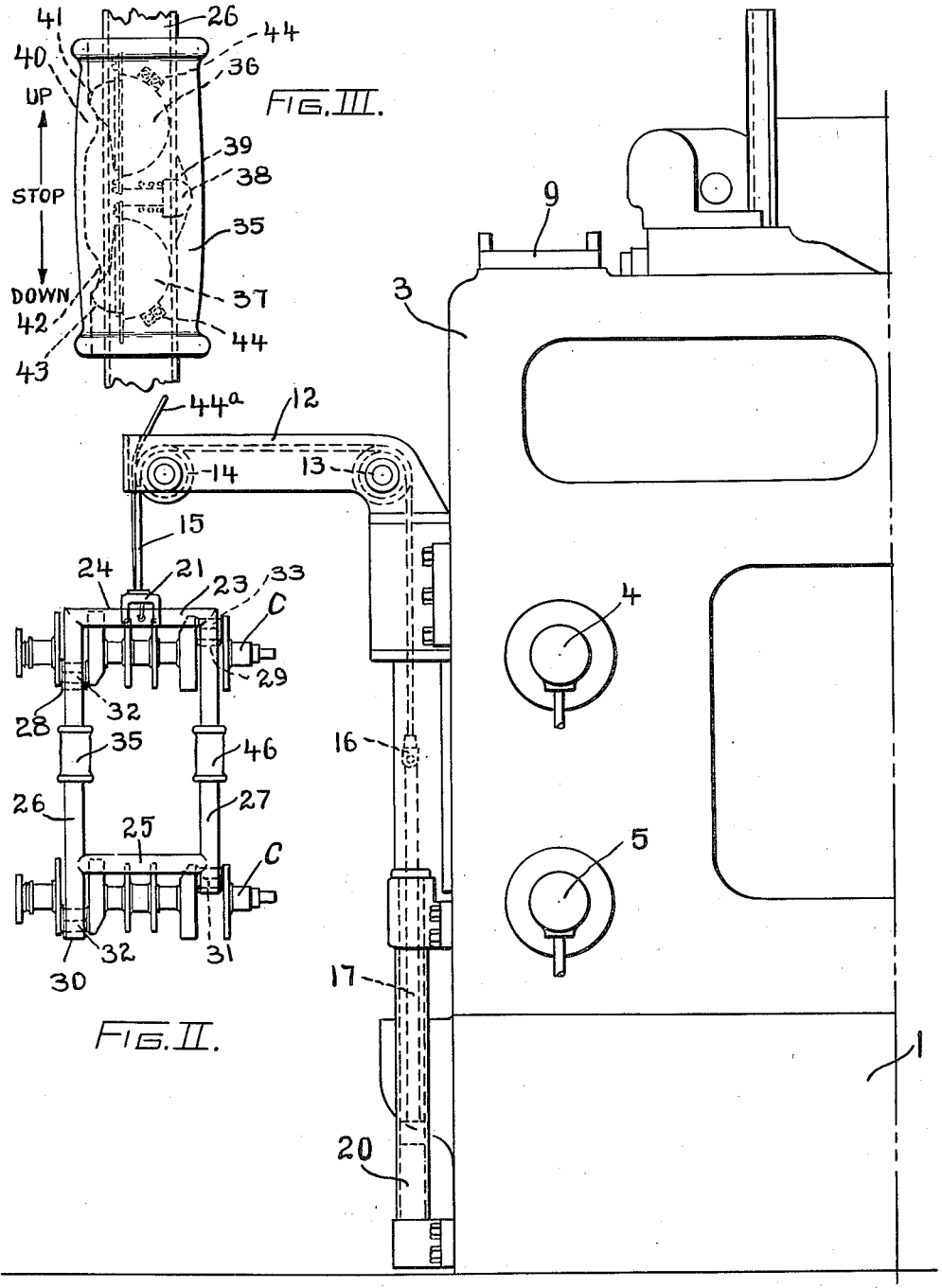
WITNESS.
Elmer R. Shipley.
INVENTOR.
MANUS F. CAMPBELL
BY Willard L. Groene
ATTORNEY.

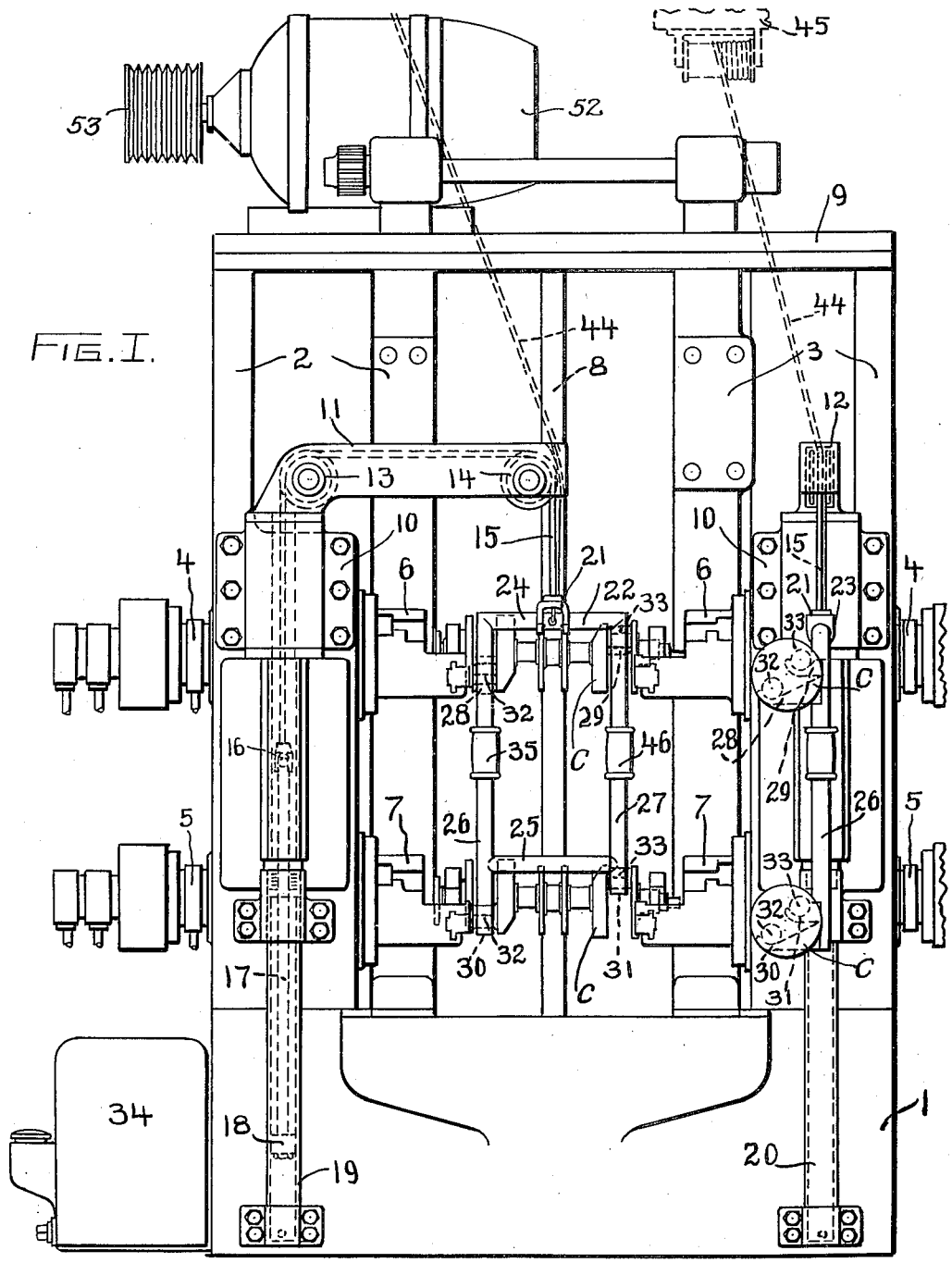

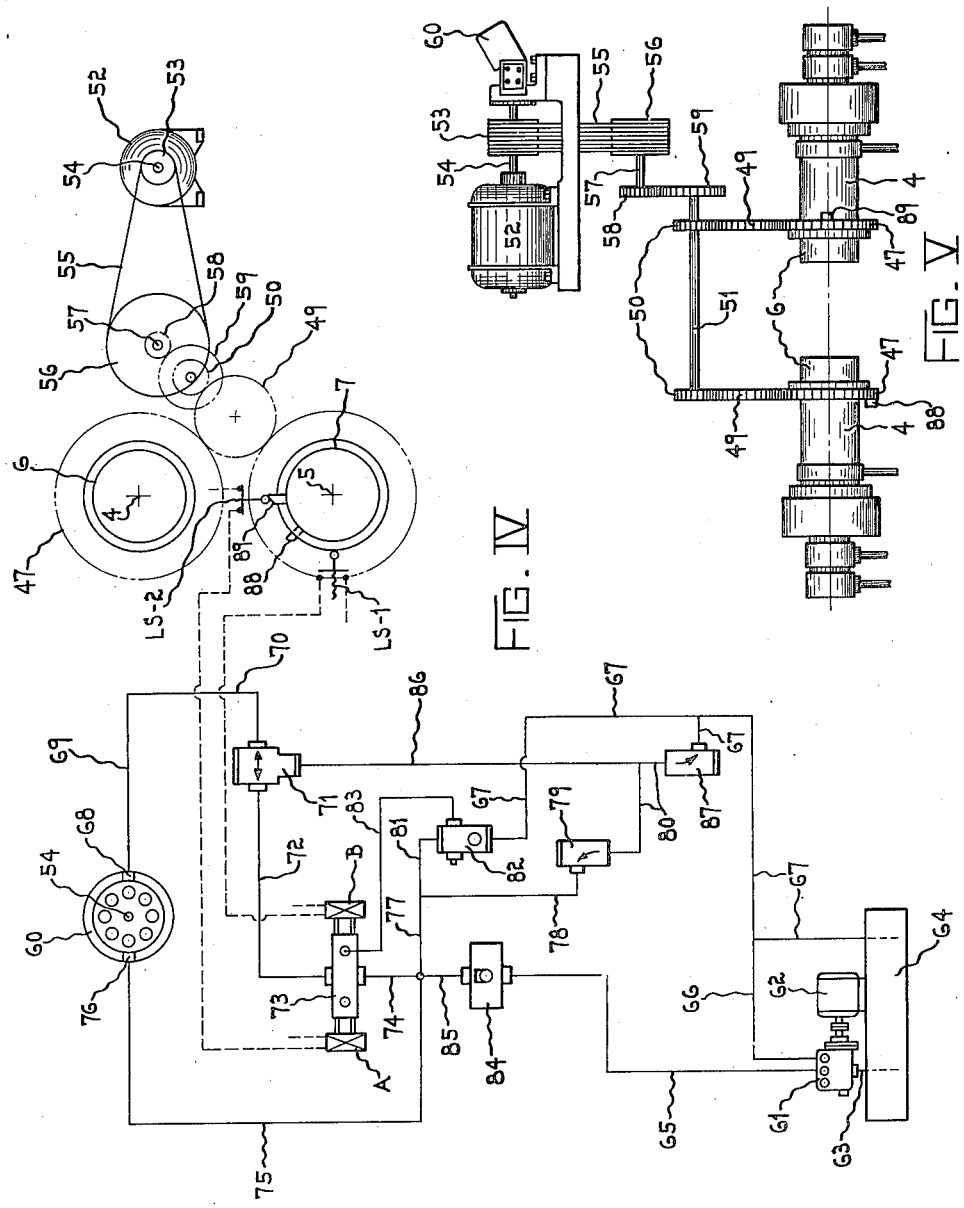

Patented Mar. 4, 1941

2,233,993

UNITED STATES PATENT OFFICE 2,233,993

LOADING AND UNLOADING OF WORK IN MACHINE TOOLS

Manus F. Campbell, Detroit, Mich., assignor to The R. K. Le Blond Machine Tool Company, Cincinnati, Ohio, a corporation of Delaware Application July 13, 1938, Serial No. 219,030

21 Claims. (Cl. 82—9)

This invention pertains to loading and unloading of work in machine tools, more particularly to the simultaneous loading and unloading of a plurality of work pieces in multiple spindle orbital lathes of a character shown in Patents 1,934,530; 1,993,994; 1,993,995; 2,089,421; and 2,138,964. In lathes of this type it has always been a difficult task to load and unload the work with rapidity and ease commensurate with the high production obtainable from such machines. It has been found in the past that in loading or unloading one spindle at a time of these machines, either manually or with a crane, that it took longer to load and unload the machine than to perform the actual cutting operations on the work pieces. As a result, the machine was standing idle a large percentage of the time when it might otherwise be producing finished work pieces, thus greatly cutting down the efficiency of the machine.

Heretofore, it had been considered impractical to attempt to simultaneously load or unload all of the spindles simultaneously because of the difficulties created by the simultaneous insertion of crankshafts in the spindle chucks and steady rests which require considerable nicety of handling on the part of the operator to even insert or remove a single crankshaft from a single spindle. When this operation was to be undertaken on a plurality of work spindles simultaneously it was considered wholly impractical from the standpoint of properly guiding all of the work pieces simultaneously into or out of the chucks and steady rests of the various spindles. Two or more crankshafts could not be inserted or removed manually by one man because two or more crankshafts of a character usually machined in such lathes weigh more than a single person could safely handle. This problem is especially difficult in such crankshaft lathes which employ chucking devices which engage finished locating areas on the rough webs and bearings of crankshafts, such for example as are shown in patents Re. 19,730 and 2,030,142 wherein the crankshaft must be accurately inserted and properly seated before clamping these chucks on the work. Care must be taken to prevent cocking and jamming the work in these chucks when inserting or removing it therefrom.

With these former difficulties clearly in mind, I have conceived the idea of providing a means, in connection with a loading and unloading device for a multiple spindle lathe, for holding a plurality of work pieces in a predetermined relationship to each other and to the work spindles into which they are to be loaded or unloaded.

Another object is to provide in a loading and unloading device for a multiple spindle crankshaft lathe, a carrier for supporting and holding a plurality of crankshafts in a predetermined position relative to each other while simultaneously inserting and removing them from the work spindles of said lathe.

Still another object is to provide a loading and unloading device for simultaneously loading and unloading work in a plurality of work spindles of a multiple spindle machine tool in which no time is required from the productive time of the machine to charge the work in and remove it from said device.

Still another object is to provide a loading and unloading device with a frame for holding a plurality of work pieces in a predetermined relationship to each other and a multiple spindle machine associated therewith in which is incorporated a combined manipulating and control means for actuating said device.

Further objects and advantages of this invention will appear from the following detailed description of the drawings in which:

Figure I is a front elevation of a multiple spindle crankshaft lathe showing the novel loading and unloading device associated therewith.

Figure II is a right hand end elevation of the lathe shown in Figure I particularly showing the position of one of the loading and unloading devices when placing work on or removing it from said devices.

Figure III is an enlarged view of the control handle for actuating the loading and unloading device.

Figure IV is a circuit diagram of an electric-hydraulic operating and control mechanism for effecting positioning of the work spindles in a predetermined indexed position for loading and unloading of work in the chucks on the spindles.

Figure V is a diagrammatic representation of the electric driving motor, the hydraulic braking motor, and associated transmission mechanism for the multiple spindle lathe shown in this case.

For purposes of an exemplary disclosure the novel loading and unloading device is shown applied to a two-spindle orbital lathe of a character shown in the above mentioned patents which has the base 1 upon which are mounted the housings 2 and 3 in which are journaled the work spindles 4 and 5. The respective pot chucks 6 and 7 of a character shown in the above mentioned chuck patents are mounted on said spindles. A steady rest unit 8 of a character shown in Patent 2,085,357 is also mounted on the base 1 and connected to the upper ends of the housings 2 and 3 by the usual tie bar 9.

Mounted on appropriate brackets 10 are the davits 11 and 12 which are free to swing in horizontal planes in said brackets 10. In each of these davits are mounted the pulleys 13 and 14 over which pass the lifting cable 15 which is connected at one end 16 to the piston rod 17 of the piston 18 of the fluid pressure cylinders 19 and 20 associated with each loading device. The other end 21 of the lifting cable is connected to the work supporting and positioning frames 22 and 23. Each of these frames comprises horizontal tubular members 24 and 25 which are fixed to the vertical tubular members 26 and 27. On these vertical members are fixed work engaging hooks 28, 29, 30 and 31 adapted to engage the crank pins 32 and 33 of the crankshafts C so as to hold them in a predetermined position relative to each other and relative to the chucks 6 and 7 when both of said crankshafts are being simultaneously placed into or removed from said chucks.

Fluid pressure for actuating the cylinders 19 and 20 is derived from the usual fluid pressure pump 34 and is controlled by the usual solenoid operated valves (not shown) for reciprocating the pistons 18 of these cylinders to effect raising and lowering of the frames 22 and 23. These solenoid valves are controlled electrically through appropriate relays by means of the three-position switch mechanism provided in the handle grip 35 on the vertical member 26. This arrangement is shown in detail in Figure III, and comprises slidingly mounting the handle grip 35 for vertical movement on the member 26. In the member 26 are mounted the "up" toggle switch 36 and the "down" toggle switch 37 and the "stop" positioning detent 38 which enters the notch 39 formed in the bore of the handle grip 35 when it is moved so neither switch is operated. When the handle grip is moved upwardly switch 36 is operated by the engagement of the projection 40 within the projection 41 of the switch 36 to energize the solenoid valve which in turn directs the fluid pressure from the pump 34 to actuate the piston 18 downwardly to raise the work supporting and positioning frame. Similarly, when the handle grip 35 is moved downwardly so its projection 42 engages the projection 43 of the switch 37 the piston 18 will be moved upwardly to lower said frame. Electrical wiring attached to the binding posts 44 of the switches passes upwardly through the tubular member 26 and through the tubular member 24 to a midway point where the cable 15 is attached to said latter member. These wires 44a then pass upwardly along side of the lifting cable 15 and over the pulley 14, riding on top of said cable, to a tensioning reel 45 appropriately mounted above said device, the reel in turn being electrically connected to said solenoid valve through the necessary relays. Another similar handle grip 46 without any switches is provided on the vertical member 27 to facilitate handling of the frame with both hands.

In the operation of this arrangement, one of the cranes is used for removing the finished work pieces while the other is used for loading rough work pieces into the lathe and in this respect it is similar to the loading and unloading devices shown in Patent 2,069,107 and copending application Serial No. 135,740 filed April 8, 1937. Assume that the crankshafts C in the chucking devices 6 and 7, Figure I, have just been machined and the chucks and steady rests unclamped; the davit 11 is then swung into the position shown with the frame 22 in lowered position. The handle grip 35 is then moved upwardly causing the frame to raise and to simultaneously engage the crankshafts as shown and continuing its upward travel to raise the crankshafts out of the chucks. The davit 11 is then swung outwardly from the machine to a position as shown for the davit 12. While these crankshafts were being machined, other finished shafts were removed from the frame 22 and rough shafts were loaded on the frame 23. After removal of the machined crankshafts as described the davit 12 and its frame while in raised position is immediately swung into position with the chucks 6 and 7. Since the crankshafts are positioned on the frame in a definite position relative to each other and the work spindles and are automatically positioned in correct circumferential or indexed position when placed on the frame, when the frame is lowered by moving the handle grip 35 downward, both crankshafts will be accurately guided simultaneously into the chucking devices of both spindles without the danger of getting them caught or jammed against the locating areas of the chucks and steady rests. This definite indexed or circumferential positioning of the crankshafts with each other and with the work spindles and chucks may be effected by stopping the work spindles in the predetermined indexed position by the usual method of manually jogging them to the required position, but may be preferably stopped automatically in such predetermined position by apparatus, for example, of a character shown in application Serial Number 209,026, filed May 20, 1938. The spindle driving arrangement shown diagrammatically in Figures IV and V for the work spindles 4 and 5 consists of gears 47 and 48 mounted on these spindles which are driven through suitable idler gears 49 by the pinions 50 fixed on the drive shaft 51. The drive shaft 51 is driven by the main drive electric motor 52 which has a pulley 53 mounted on its motor shaft 54 connected by suitable belts 55 to the driving pulley 56 mounted on the pulley shaft 57 upon which shaft is fixed the driving pinion 58 which drives the gear 59 fixed on the drive shaft 51 whereby the motor 52 may rotate spindles 4 and 5. Also connected to the shaft 54 is the hydraulic braking motor 60 which may be of the usual gear pump or piston pump type.

The supply of fluid pressure for the hydraulic control system may be derived from the usual hydraulic fluid pressure pump 61 driven by an electric motor 62 which draws fluid through the suction line 63 from the fluid reservoir 64 and delivers fluid under pressure through the pressure line 65. Drainage from a relief valve in the pump 61 for maintaining pressure in the line 65 is exhausted through the line 66 into the drain line 67 which returns fluid to the reservoir 64.

In the operation of the lathe when the main drive motor 52 is operating driving the work spindles 4 and 5 during the cutting operation, the hydraulic braking motor 60 is also being driven by the motor shaft 54. Under these conditions fluid is discharged from the exhaust port 68 of the braking motor 60 through the lines 69 and 70, passes freely through the relief valve 71, through the line 72, the solenoid operated control valve 73, which is normally spring set in neutral position at this time, into the line 74, and then through the line 75 back to the intake port 76 of the braking motor 60 to form a closed circuit for free circulation of fluid at large volume when the electric motor 52 is running at full speed offering no resistance to the rotation of the braking motor 60. Fluid from this closed circuit may not escape through the lines 77 and 78 because of the check valve 79 which only permits flow of fluid from the line 80 to the line 78. Nor may fluid escape through the line 81 from line 77 since this latter line is at all times closed off at the control valve 82 and serves only to supply fluid pressure for opening the valve 82 to connect line 83 to the drain line 67, which connection is normally cut off by the spring set arrangement in the valve when the pressure drops in the line 81.

High pressure is maintained in the closed circulating circuit by pressure received from the pressure line 65 which passes through the speed control valve 84 which in turn discharges the high pressure fluid into the line 85 connected to said circuit at a definite relatively small volume for at all times maintaining the high pressure in the circuit and to make up for any leakage from said circuit. This discharge from the valve 84 is also utilized to rotate the hydraulic braking motor 60 at a definite slow speed for driving the electric motor 52 and the lathe spindles 4 and 5 at slow speed preparatory to stopping said spindles or when jogging the spindles as will be described. The relief valve 71, while at all times allows free flow between the lines 79 and 72, is so set at a pressure higher than that of the relief valve in the pump 61, or in other words than the pressure in the closed circuit, that fluid does not escape under these conditions through the by-pass line 86, line 80, the check valve 87 and into the drain line 67.

Immediately upon disconnecting the electrical power from the motor 52 the otherwise inoperative limit switch LS1 associated with the work spindle 4 becomes effective through the usual relays and contactors (not shown) and is engaged by a dog 88 on the spindle to cause the solenoid B of the control valve 73 to be energized, operating the valve 73 so as to close off the line 74 and to connect line 72 to line 83. This causes the pressure to drop to substantially zero in the lines 75, 77, 78, and 81 because the intake volume through the port 76 of the braking motor 60, which is being driven at a high rate of speed by the momentum of the electric motor 52 and the associated driving transmission and work spindle, is far in excess of that which can be supplied by the valve 84 through the line 85. Dropping the pressure in the line 81 causes the valve 82 to operate by its spring to close off the line 83 thus preventing fluid from passing through the line 72. Extremely high pressure is momentarily built up in lines 69 and 70 until the momentum in the electric motor and spindle transmission is absorbed by bypassing fluid through the high pressure relief valve 71 into the line 86. The discharge through the line 86 passes through the line 80, through the check valve 79, and into the line 33 due to the suction action set up in the lines 78, 77 and 75 by the rapid intake of the hydraulic braking motor. The check valve 87, which is arranged to prevent flow from drain line 67 to line 80, maintains the suction action through the check valve 79.

The hydraulic braking motor 60 will continue to decelerate in bypassing fluid through the valve 71 until it has slowed down to a point where the volume take into the intake port 76 is equal to that being supplied through the line 85 from the valve 84. The valve 71 is so set as to effect the deceleration about a half revolution of the work spindle. After the hydraulic braking motor 60 has decelerated to the above point pressure again builds up in the lines 75, 77, 78, and 81 and the motor 60 is driven at a relatively slow speed for similarly rotating the work spindle by fluid from the line 85. Building up pressure in the line 81 again opens the valve 82 connecting line 83 to the drain line 67, allowing free flow of fluid through line 72 thus eliminating all back pressure at the exhaust port 68 of the hydraulic braking motor 60 which would otherwise hinder the operation of said motor 60 at the predetermined slow speed.

As soon as the limit switch LS1 is operated the otherwise inoperative limit switch LS2 is then rendered in a condition to be effective when operated. The limit switch LS2 is operated when the dog 89 carried on the spindle 4 engages it as it is rotated at the predetermined slow speed by the hydraulic braking motor 60. Operation of the limit switch LS2, through appropriate relays and contactors (not shown), causes the solenoid A of the control valve 73 to be operated which closes off the line 72 and connects the line 74 to the line 83. Flow through line 72 is thus stopped causing back pressure to substantially instantly build up in lines 69 and 70 to stop rotation of the hydraulic braking motor, and thus work spindle center drive ring gears in a predetermined position depending on the setting of the dog 89 on the spindle, from its slow rotating speed since the relief valve 71 is set at a greater pressure than that supplied to the port 76 of the motor 60 by the line 85. Substantially no fluid would escape through the line 86 from the valve 71 under these conditions, thus providing very accurate stopping of the spindles and the chuck in accurate predetermined indexed position. The valve 82 under these conditions will merely float on the line 83 since the control pressure in the line 81 will be determined by spring pressure setting of the valve 37.

When the main drive electric motor is again supplied with current solenoid A is de-energized and the valve 73 allowed to come to its spring set neutral position and both limit switches LS1 and LS2 are rendered ineffective by the usual electrical relays and contactors (not shown) so that the machine is then ready for repeating the above cycle of operation.

When it is desired to jog the work spindles 4 and 5 it is only necessary to provide suitable electrical means for cutting out the limit switches LS1 and LS2 and to alternately energize one of the other of the solenoids A and B of the control valve 73. When the solenoid B is energized the work spindles rotate at a predetermined slow speed and when solenoid A is energized the center drive gears are substantially instantly stopped as described above.

Thus great saving is effected in the loading and unloading time required in the operation of the lathe in that both spindles may be loaded and unloaded simultaneously. Also with this arrangement no productive time from the machine is consumed in placing the work on and removing it from said loading and unloading devices. Furthermore, great skill upon the part of the operator to carefully guide the crankshafts into and out of the work spindles has been substantially eliminated.

Having thus set forth and described my invention, what I claim and desire to secure by United States Letters Patents is:

1. In a multiple spindle machine tool, a pair of rotary work spindles, chucks mounted on said spindles, loading and unloading mechanism associated with said chucks, means for stopping rotation of said spindles at a predetermined indexed position, means incorporated in said mechanism for simultaneously holding a plurality of work pieces in a predetermined indexed position relative to one another and to said chucks, and means for actuating said mechanism for simultaneously loading or unloading said work pieces into or out of said chucks.

2. In a multiple spindle machine tool, a plurality of work spindles, means for rotating said work spindles, chucking devices mounted on said spindles, means for stopping rotation of said spindles at a predetermined indexed position when loading and unloading work in said devices, loading mechanism associated with said chucks comprising a member adapted to engage and support a plurality of work pieces in a predetermined position relative to each other and to said chucking devices when loading and unloading work in said machine tool, and means for actuating said loading mechanism whereby said work pieces may be simultaneously inserted in or withdrawn from said chucking devices when stopped in said predetermined position.

3. In a multiple spindle machine tool, a plurality of work spindles, chucks mounted on said spindles, means for stopping rotation of said spindles at a predetermined indexed position, a loading device associated with said chucks having a member adapted to engage a plurality of work pieces and hold them in predetermined indexed relationship to one another and to said chucks, and means for lowering and raising said member for simultaneously inserting or withdrawing said work pieces from said chucking devices.

4. In a multiple spindle machine tool, a plurality of work spindles, chucks mounted on said spindles, a loading device associated with said spindles comprising, a work engaging member adapted to engage a plurality of work pieces to hold them in a predetermined relationship to one another and to said chucks, means for raising and lowering said member, and means for swinging said member to and from said work spindles when said member is in raised position.

5. In a multiple spindle machine tool, a plurality of axially spaced work spindles, chucks on said spindles, a loading device associated with said spindles comprising a work engaging frame for holding a plurality of crankshafts in predetermined axially spaced relationship to each other and to said work spindles, means for lowering and raising said frame and means for moving said frame to and from said work spindles when said frame is in raised position.

6. In a multiple spindle machine tool, a plurality of axially spaced work spindles, pot chucks mounted on said spindles, a loading device associated with said chucks comprising a member adapted to engage and carry a plurality of crankshafts in axially spaced relationship to one another and to said work spindles, means for lowering and raising said frame, and means for swinging said frame to and from said work spindles.

7. In a multiple spindle machine tool, a plurality of axially spaced vertically arranged work spindles, chucking devices mounted on said spindles, a loading device associated with said spindles and chucks having a work supporting member adapted to hold a plurality of work pieces in a predetermined axially spaced relationship to each other and to said chucking devices, means for vertically moving said member for inserting said work pieces in or withdrawing them simultaneously from said chucking devices, and means for bodily moving said member to and from said work spindles.

8. In a multiple spindle machine tool, a plurality of rotatable work spindles, chucking devices mounted on said spindles, a pair of loading devices associated with said spindles, a work engaging frame associated with each loading device and adapted to carry a plurality of work pieces, means for raising and lowering said frame, and means for swinging one or the other of said members to or from said work spindles when said member is in raised position whereby one of said device is adapted to simultaneously load a plurality of work pieces in said chucks and wherein said other device is adapted to simultaneously remove a plurality of work pieces from said chucking devices.

9. In a multiple spindle lathe, a plurality of work spindles arranged in a plane in axially spaced relationship to one another, chucking devices mounted on said spindles, a loading device associated with said spindles having a work engaging and supporting member adapted to carry a plurality of work pieces, means for moving said member parallel with said mentioned plane, and means for moving said member perpendicularly to said plane.

10. In a multiple spindle lathe, a plurality of vertically positioned axially spaced work spindles, chucking devices mounted on said spindles, loading mechanism associated with said spindles having a member adapted to carry a plurality of work pieces to be inserted in or removed from said chucks, means for vertically reciprocating said member, and means for moving said member horizontally relative to said chucking devices when said member is in raised position whereby a plurality of work pieces may be simultaneously inserted in or removed from said chucking devices.

11. In a multiple spindle machine tool, a pair of rotary work spindles, means for rotating said work spindles, pot chucks adapted to radial loading and unloading mounted on said spindles, a loading and unloading device associated with said chucks adapted to support a pair of work pieces for simultaneously moving said work pieces radially of said chucking devices for loading and unloading said work pieces simultaneously into or out of said chucking devices.

12. In a multiple spindle lathe, a pair of rotary work spindles axially spaced in a vertical plane, pot chucks on said work spindles adapted to radial loading, a loading device comprising a horizontally swinging davit, a cable extending downward from said davit and actuated by power means associated therewith, a frame connected to said cable adapted to be raised and lowered by said cable, means on said frame for engaging a plurality of work pieces to hold them in predetermined axially spaced position relative to each other, and means on said frame for manually effecting raising and lowering of said cable and for manipulating said frame whereby a plurality of work pieces may be simultaneously inserted in or removed from said chucks.

13. In a multiple spindle machine tool, a pair of axially spaced, vertically arranged, rotary work spindles, chucking devices mounted on said spindles, a pair of loading devices associated with said spindles having a work carrying frame adapted to support a plurality of work pieces in axially spaced vertical position, means for raising and lowering said frame and means for swinging said member to and from said work spindles wherein one of said members is utilized for inserting a plurality of said work pieces simultaneously into said chucks and wherein said other loading device is utilized for removing work pieces from said chucks.

14. In a multiple spindle machine tool, a plurality of rotary work spindles, chucks mounted on said spindles, a loading device comprising a davit swinging in a horizontal plane relative to said work spindles, a cable in said davit connected to a work supporting and carrying frame arranged to carry a plurality of work pieces in predetermined axially spaced vertical position, and means on said frame for effecting raising and lowering of said frame and for guiding said frame relative to said chucking devices to facilitate simultaneous loading and unloading of a plurality of work pieces into or out of said chucking devices.

15. In a multiple spindle machine tool, a pair of rotary work spindles located in a vertical plane in a predetermined axially spaced position, chucking devices adapted to radial loading mounted on said spindles, a loading device associated with said chucks comprising a member adapted to support a plurality of work pieces in a vertical plane and in the same predetermined axially spaced position as said work spindles, means for raising and lowering said member for radially inserting or removing said work pieces simultaneously into and out of said chucking devices, and means for bodily moving said member horizontally relative to said work spindles to facilitate placing and removing work pieces from said member.

16. In a multiple spindle orbital lathe, a plurality of axially spaced rotatable work spindles, chucking devices mounted on said spindles having means for engaging crankshafts to be machined by means of machined locating areas on the web and bearing portions of said crankshafts, means for rotating said work spindles, and means for stopping said spindles in a predetermined position, loading and unloading mechanism associated with said spindles and chucking devices comprising a member adapted to engage and support a plurality of crankshafts in axially spaced relationship, means for moving said member in a plane parallel with the plane of arrangement of said work spindles, and means for bodily moving said member perpendicularly to said mentioned plane.

17. In a multiple spindle orbital lathe, a plurality of axially spaced rotatable work spindles arranged in a plane, pot chucks associated with said work spindles adapted to radial loading and unloading, a member for supporting a plurality of crankshafts in axially spaced relationship, means for moving said member in a plane parallel to the plane of arrangement of said work spindles, to radially insert or withdraw said crankshafts simultaneously from said chucks.

18. In a multiple spindle orbital lathe, a plurality of axially spaced work spindles arranged in a plane, chucking devices associated with said spindles adapted to radial loading and having means therein for engaging and holding a crankshaft by machined locating areas on the web and bearing portions thereof, loading mechanism associated with said chucks comprising a member adapted to engage a plurality of crankshafts and to hold them in a predetermined indexed position relative to one another so as to cause them to enter said chucking devices in a predetermined position, means for moving said member in a plane parallel to the plane of arrangement of said spindles for simultaneously radially inserting or withdrawing said crankshafts from said chucks, and means for bodily moving said member, when said crankshafts are radially withdrawn from said chucks, to and from said work spindles perpendicular to said mentioned plane to facilitate placing and removing said crankshafts from said member.

19. In a multiple spindle orbital lathe a pair of vertically positioned, axially spaced work spindles, pot chucks, mounted on said spindles adapted to radial loading and unloading, loading mechanism associated with said chucks comprising a crane having a swinging davit movable in a horizontal plane, a lifting cable, power means for actuating said lifting cable, and a work supporting frame adapted to carry a plurality of axially spaced vertically arranged crankshafts to be inserted or withdrawn from said chucks, and means on said frame for simultaneously actuating said cable for raising and lowering said frame and for manipulating said frame relative to said work spindles whereby a plurality of crankshafts may be simultaneously inserted in or withdrawn from said chucking devices.

20. In a multiple spindle orbital lathe a pair of axially spaced, vertically arranged, work spindles, pot chucks on said spindles adapted to engage crankshafts by means of machined locating surfaces thereon, a loading device associated with said work spindles comprising a swinging davit movable in a horizontal plane, a lifting cable in said davit, power means for actuating said lifting cable, a work carrying frame mounted on said cable, and means on said frame for simultaneously actuating said power means for raising and lowering said cable and frame and for manipulating said frame relative to said work spindles.

21. In a multiple spindle machine tool, a plurality of axially spaced work spindles, a loading device associated with said spindles comprising a member adapted to engage and carry a plurality of work pieces in axially spaced relationship to one another and to said work spindles, means for lowering and raising said frame, and means for swinging said frame from a position perpendicular to said work spindles to a position parallel with said spindles.

MANUS F. CAMPBELL.